US012122984B2

(12) United States Patent
Silvernail et al.

(10) Patent No.: US 12,122,984 B2
(45) Date of Patent: Oct. 22, 2024

(54) SOLID RINSE AID COMPOSITION COMPRISING POLYACRYLIC ACID

(71) Applicant: ECOLAB USA INC., Saint Paul, MN (US)

(72) Inventors: Carter M. Silvernail, Saint Paul, MN (US); Erik C. Olson, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

(21) Appl. No.: 18/173,543

(22) Filed: Feb. 23, 2023

(65) Prior Publication Data

US 2023/0203404 A1 Jun. 29, 2023

Related U.S. Application Data

(60) Continuation of application No. 17/445,297, filed on Aug. 17, 2021, now Pat. No. 11,624,043, which is a (Continued)

(51) Int. Cl.

| | |
|---|---|
| ***C11D 3/37*** | (2006.01) |
| ***C11D 1/72*** | (2006.01) |

(Continued)

(52) U.S. Cl.

CPC .............. *C11D 3/3707* (2013.01); *C11D 1/72* (2013.01); *C11D 3/2068* (2013.01); *C11D 3/323* (2013.01);

(Continued)

(58) Field of Classification Search

CPC ....... C11D 3/3707; C11D 1/72; C11D 3/2068; C11D 3/323; C11D 3/3418; C11D 3/3757;

(Continued)

(56) References Cited

U.S. PATENT DOCUMENTS 4,678,596 A 7/1987 Dupre et al.
5,358,653 A 10/1994 Gladfelter et al.

(Continued)

FOREIGN PATENT DOCUMENTS

EP 0182461 B1 9/1985
EP 0308221 B1 3/1989

(Continued)

OTHER PUBLICATIONS

European Search Report, Application/Patent No. 15835104.9-1375/3186353, PCT/US2015047597 Jan. 3, 2018.

(Continued)

*Primary Examiner* — Duy Vu N Deo
*Assistant Examiner* — Christopher Remavege
(74) *Attorney, Agent, or Firm* — McKee, Voorhees & Sease, PLC

(57) ABSTRACT

Solid rinse aid compositions, methods of use, and methods of making said composition are disclosed. Rinse aid is provided by a solidification agent, a sheeting agent, a defoamer component, and a polyacrylic acid homopolymer or alkali metal salt thereof forming a solid compositions. Preferred solidification agents include aromatic sulfonates. Preferred sheeting agents include one or more alcohol ethyoxylates. Preferred defoamer components include a polymer compound including one or more ethylene oxide groups. The solid rinse aid compositions are preferably substantially free of sulfate and sulfate-containing compounds.

20 Claims, 1 Drawing Sheet

Related U.S. Application Data division of application No. 14/839,479, filed on Aug. 28, 2015, now Pat. No. 11,118,140.

(60) Provisional application No. 62/043,572, filed on Aug. 29, 2014.

(51) Int. Cl.

| | |
|---|---|
| ***C11D 3/20*** | (2006.01) |
| ***C11D 3/32*** | (2006.01) |
| ***C11D 3/34*** | (2006.01) |
| ***C11D 3/48*** | (2006.01) |
| ***C11D 17/00*** | (2006.01) |

(52) U.S. Cl.

CPC .......... *C11D 3/3418* (2013.01); *C11D 3/3757* (2013.01); *C11D 3/3761* (2013.01); *C11D 3/48* (2013.01); *C11D 3/2086* (2013.01); *C11D 3/3481* (2013.01); *C11D 3/349* (2013.01); *C11D 17/0052* (2013.01)

(58) Field of Classification Search

CPC ....... C11D 3/3761; C11D 3/48; C11D 3/2086; C11D 3/3481; C11D 3/349; C11D 17/0052; C11D 11/0023

USPC .......... 134/25.2, 25.3, 39, 42; 510/514, 224, 510/220, 446, 421, 197, 445, 457

See application file for complete search history.

(56) References Cited

U.S. PATENT DOCUMENTS

| | | | | |
|---|---|---|---|---|
| 5,378,384 | A | 1/1995 | Hopstock et al. | |
| 5,415,814 | A * | 5/1995 | Ofosu-Asante ...... | C11D 17/003 510/423 |
| 5,417,893 | A * | 5/1995 | Ofosu-Asante ........ | C11D 1/652 510/108 |
| 5,674,831 | A | 10/1997 | Schutz | |
| 5,876,514 | A | 3/1999 | Rolando | |
| 5,880,087 | A * | 3/1999 | Zack ........................ | C11D 3/36 510/499 |
| 5,880,088 | A | 3/1999 | Lentsch et al. | |
| 5,880,089 | A | 3/1999 | Lentsch et al. | |
| 6,210,600 | B1 | 4/2001 | Zhou et al. | |
| RE38,262 | E | 10/2003 | Rolando et al. | |
| 6,630,440 | B1 * | 10/2003 | Song .................... | C11D 3/3472 510/525 |
| 6,730,645 | B1 * | 5/2004 | Foley ....................... | C11D 1/66 510/229 |
| 7,279,455 | B2 | 10/2007 | Kieffer et al. | |
| 7,521,412 | B2 | 4/2009 | Kieffer et al. | |
| 7,883,584 | B2 | 2/2011 | Kieffer et al. | |
| 7,960,333 | B2 | 6/2011 | Kieffer et al. | |
| 8,367,600 | B2 | 2/2013 | Kieffer et al. | |
| 8,461,090 | B2 | 6/2013 | Glenn, Jr. | |
| 2001/0023933 | A1 | 9/2001 | Ogata et al. | |
| 2004/0259748 | A1 | 12/2004 | Wiedemann et al. | |
| 2005/0101516 | A1 | 5/2005 | Kieffer et al. | |
| 2006/0075576 | A1 | 4/2006 | Price | |
| 2008/0221006 | A1 * | 9/2008 | Heisig ...................... | C11D 3/48 510/245 |
| 2008/0274930 | A1 | 11/2008 | Smith et al. | |
| 2008/0293615 | A1 * | 11/2008 | Kieffer ................... | C11D 1/825 510/514 |
| 2009/0105111 | A1 * | 4/2009 | Stolte ................... | C11D 3/3707 510/392 |
| 2009/0165818 | A1 | 7/2009 | Smith et al. | |
| 2010/0229897 | A1 | 9/2010 | Miralles et al. | |
| 2010/0267844 | A1 | 10/2010 | Varineau et al. | |
| 2010/0292127 | A1 * | 11/2010 | Kieffer ................. | C11D 3/2068 510/514 |
| 2011/0065623 | A1 | 3/2011 | Rigley et al. | |
| 2011/0108068 | A1 | 5/2011 | Kieffer et al. | |
| 2011/0130322 | A1 | 6/2011 | Song et al. | |
| 2012/0053105 | A1 * | 3/2012 | Olson .................. | C11D 3/0073 524/556 |
| 2013/0252871 | A1 | 9/2013 | Olson | |
| 2013/0345111 | A1 | 12/2013 | Kieffer et al. | |
| 2016/0006057 | A1 | 3/2016 | Silvernail et al. | |
| 2017/0066928 | A1 | 3/2017 | Camps et al. | |

FOREIGN PATENT DOCUMENTS

| | | | |
|---|---|---|---|
| EP | 0245987 | A2 | 10/1991 |
| EP | 0659873 | A1 | 6/1995 |
| EP | 0851021 | A2 | 7/1998 |
| EP | 0851022 | A3 | 1/2000 |
| EP | 1667176 | B1 | 6/2006 |
| EP | 0851022 | B1 | 2/2007 |
| EP | 2043112 | B1 | 4/2009 |
| JP | 7500850 | A | 1/1995 |
| JP | 2006265463 | A | 10/2006 |
| JP | 200850410 | A | 3/2008 |
| JP | WO2011004791 | A1 | 12/2012 |
| KR | 1020040023795 | A | 3/2004 |
| WO | 2008146177 | A1 | 12/2008 |
| WO | 2010086821 | A2 | 8/2010 |
| WO | 2011024094 | A2 | 3/2011 |
| WO | 2011089493 | A2 | 7/2011 |
| WO | 2013192315 | A1 | 12/2013 |

OTHER PUBLICATIONS

Rohm and Haas, "Acusol 445/445N/445ND," Product Data Sheet, available at www.dow.com, 5 pages Jul. 30, 2006.

The MAK Collection for Occupational Health and Safety, "Sodium pyrithion," vol. 10, pp. 287-311 Jan. 31, 2012.

International Searching Authority, "International Search Report & Written Opinion" issued in connection to International Application No. PCT/US15/047597, 11 pages Oct. 27, 2015.

* cited by examiner

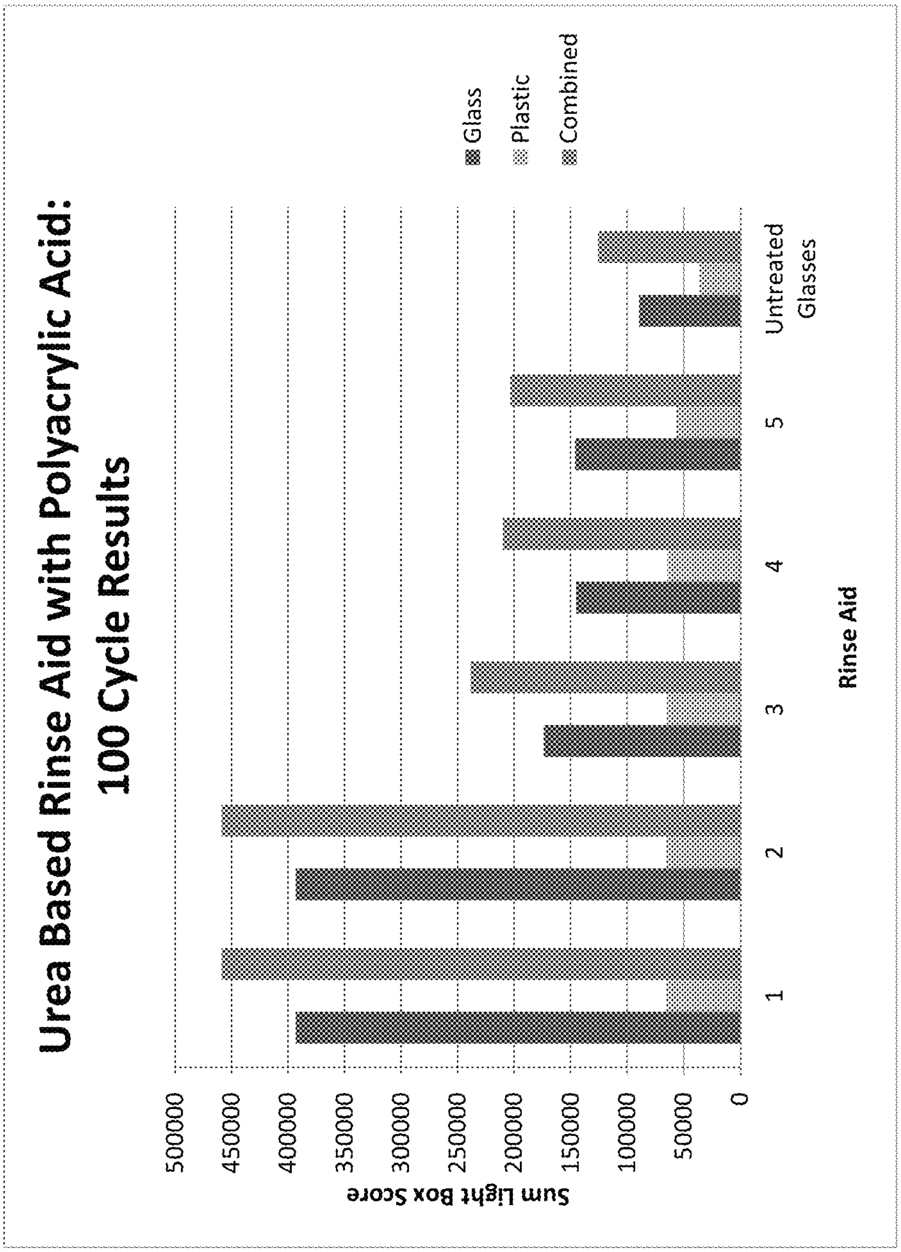
Urea Based Rinse Aid with Polyacrylic Acid:
100 Cycle Results
Sum Light Box Score
500000
450000
400000
350000
300000
250000
200000
150000
100000
50000
0
1
2
3
4
5
Untreated Glasses
Rinse Aid
Glass
Plastic
Combined

SOLID RINSE AID COMPOSITION COMPRISING POLYACRYLIC ACID

CROSS REFERENCE TO RELATED APPLICATIONS

This is a Continuation application of U.S. Ser. No. 17,445,297, filed Aug. 17, 2021, which is a Divisional Application of U.S. Ser. No. 14/839,479, filed Aug. 28, 2015, now U.S. Pat. No. 11,118,140, issued Sep. 14, 2021, which claims priority under 35 U.S.C. § 119 to provisional application U.S. Ser. No. 62/043,572 filed Aug. 29, 2014; the provisional is incorporated by reference.

FIELD OF THE INVENTION

The invention relates to rinse aids. In particular, solid rinse aid compositions comprising a defoamer, sheeting agent, solidification agent, and a polyacrylic acid homopolymer, wherein the composition is substantially free of sulfate or sulfate containing compounds.

BACKGROUND OF THE INVENTION

Mechanical warewashing machines including dishwashers have been common in the institutional and household environments for many years. Such automatic warewashing machines clean dishes using two or more cycles which can include initially a wash cycle followed by a rinse cycle. Such automatic warewashing machines can also utilize other cycles, for example, a soak cycle, a pre-wash cycle, a scrape cycle, additional wash cycles, additional rinse cycles, a sanitizing cycle, and/or a drying cycle. Any of these cycles can be repeated, if desired and additional cycles can be used. Rinse aids are conventionally used in warewashing applications to promote drying and to prevent the formation of spots on the ware being washed.

In order to reduce the formation of spotting, rinse agents have commonly been added to water to form an aqueous rinse that is sprayed on the dishware after cleaning is complete. The precise mechanism through which rinse agents work is not established. One theory holds that the surfactant in the rinse agent is absorbed on the surface at temperatures at or above its cloud point, and thereby reduces the solid-liquid interfacial energy and contact angle. This leads to the formation of a continuous sheet which drains evenly from the surface and minimizes the formation of spots. Generally, high foaming surfactants have cloud points above the temperature of the rinse water, and, according to this theory, would not promote sheet formation, thereby resulting in spots. Moreover, high foaming materials are known to interfere with the operation of warewashing machines.

In some cases, defoaming agents have been used in an attempt to promote the use of high foaming surfactants in rinse aids. In theory, the defoaming agents can include surfactants with a cloud point at or below the temperature of the rinse water, and would thereby precipitate out and modify the air/liquid interface and destabilize the presence of foam that may be created by the high foaming surfactants in the rinse water. However, in many cases, it has been difficult to provide suitable combinations of high foaming surfactants and defoamers to achieve desired results. For example, for certain high foaming surfactants, it has often been necessary to provide defoaming agents that are chemically quite complicated. For example, published International Patent Application No. WO89/11525 discloses an ethoxylate defoamer agent that is capped with an alkyl residue.

A number of rinse aids are currently known, each having certain advantages and disadvantages. There is an ongoing need for alternative rinse aid compositions, especially alternative rinse aid compositions that are environmentally friendly (e.g., biodegradable), and that essentially include components that are suitable for use in food service industries, e.g. GRAS ingredients (generally recognized as safe by the USFDA, partial listing available at 21 C.F.R. §§ 184).

In order to reduce the formation of spotting, rinse aids have commonly been added to water to form an aqueous rinse that is sprayed on the ware after cleaning is complete. A number of rinse aids are currently known, each having certain advantages and disadvantages. There is an ongoing need for alternative rinse aid compositions.

Objects, advantages and features of the present invention will become apparent from the following specification taken in conjunction with the accompanying drawings.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 1 shows a graph of the total light box scores of the experimental formulation in comparison to untreated glasses. The values shown are the sum of six independent measurements for glass, one independent measurement for plastic, and the sum of the glass and plastic measurements for the combined representation.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

BRIEF SUMMARY OF THE INVENTION

A solid rinse aid composition, methods of use, and methods of making said composition are disclosed. The solid rinse aid compositions provide improved rinsing properties and compositions that are considered GRAS.

An embodiment of the invention is a solid compositions is provided and comprises a solidification agent, a sheeting agent comprising one or more alcohol ethoxylates, a defoamer component comprising a polymer compound including one or more ethylene oxide groups, and a polyacrylic acid homopolymer or alkali metal salt thereof, wherein the compositions is substantially free of sulfate and sulfate-containing compounds.

In another embodiment of the invention, the solid rinse aid compositions comprises: a solidification agent present in an amount between about 30 wt. % and about 75 wt. % of the composition, a sheeting agent present in an amount between about 1 wt. % and about 35 wt. % of the composition, a defoamer present in an amount between about 5 wt. % and about 50 wt. % of the composition, and a polyacrylic acid homopolymer or alkali metal salt thereof is present between about 1 wt. % and about 40 wt. % of the composition.

In another embodiment of the invention, the solid rinse aid composition further comprises a preservative and a hydroxycarboxylic acid, wherein the preservative is selected from the group consisting of methylchloroisothiazolinone, methylisothiazolinone, and mixtures of the same, and wherein the hydroxycarboxylic acid comprises citric acid, an anhydrous alkali metal salt of citric acid, a hydrated alkali metal salt of citric acid and combinations thereof. According a further embodiment of the invention, the preservative is present between about 0.01 wt. % and about 5 wt. % of the composition, and wherein the hydroxycarboxylic acid is present from about 0.1 wt. % to about 20 wt. % of the composition.

Another embodiment of this invention is a method of cleaning a surface comprising contacting a solid surface with a detergent and the solid rinse compositions of the present invention. A further embodiment of the invention is a method of cleaning a surface, wherein the surface is a ware, and wherein said solid rinse aid contacts the surface after the detergent and is diluted with water to form a use solution prior to contacting the soiled surface, and wherein said use solution is at a concentration less than about 2000 ppm.

Another embodiment of this invention is a method for making a solid rinse compositions that is substantially free of sulfate and sulfate-containing compounds comprising mixing a solidification agent, a sheeting agent comprising one or more alcohol ethoxylates, a defoamer component comprising a polymer compound including one or more ethylene oxide groups, and a polyacrylic acid homopolymer to form a mixture and forming a solid rinse aid composition.

A further embodiment of this invention includes heating the mixture prior to after forming a solid rinse aid composition.

A further embodiment of this invention is a method for making solid rinse compositions that is substantially free of sulfate and sulfate-containing compounds comprising mixing between about 20 wt. % and about 75 wt. % of a solidification agent, between about 1 wt. % and about 35 wt. % of a sheeting agent comprising one or more alcohol ethoxylates, between about 5 wt. % and about 50 wt. % of a defoamer component comprising a polymer compound including one or more ethylene oxide groups, and between about 1 wt. % and about 40 wt. % of a polyacrylic acid homopolymer to form a mixture and forming a solid rinse aid composition.

A further embodiment of this invention is a method for making solid compositions further comprising a preservative and a hydroxycarboxylic acid, wherein the preservative is selected from the group consisting of methylchloroisothiazolinone, methylisothiazolinone, and mixtures of the same and is present in an amount of between about 0.01 wt. % and about 5 wt. % of the composition, and wherein the hydroxycarboxylic acid comprises citric acid, an anhydrous alkali metal salt of citric acid, a hydrated alkali metal salt of citric acid and combinations thereof and is present in an amount of between about 0.1 wt. % and about 20 wt. % of the composition.

A further embodiment of this invention is a method for making solid compositions further comprising one or more additional functional ingredients.

DETAILED DESCRIPTION OF THE PREFERRED EMBODIMENT

The present invention relates to solid rinse aid compositions. The solid rinse aid compositions have many advantages over existing rinse aids. For example, they provide improved rinsing properties and compositions that are considered GRAS.

The embodiments of this invention are not limited to use with particular detergents or cleaning apparatuses, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, propyheptyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents can include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups can be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

An "anti-redeposition agent" refers to a compound that helps keep suspended in water instead of redepositing onto the object being cleaned. Anti-redeposition agents are useful in the present invention to assist in reducing redepositing of the removed soil onto the surface being cleaned.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

The term "generally recognized as safe" or "GRAS," as used herein refers to components classified by the Food and Drug Administration as safe for direct human food consumption or as an ingredient based upon current good manufacturing practice conditions of use, as defined for example in 21 C.F.R. Chapter 1, § 170.38 and/or 570.38.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces can include for example, health care surfaces and food processing surfaces.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than 0.5 wt. %. More preferably, the amount of phosphorus is less than 0.1 wt. %, and most preferably the amount of phosphorus is less than 0.01 wt. %.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to, isotactic, syndiotactic and random symmetries, and combinations thereof. Furthermore, unless otherwise specifically limited, the term "polymer" shall include all possible geometrical configurations of the molecule.

As used herein, the term "soil" or "stain" refers to a non-polar oily substance which may or may not contain particulate matter such as mineral clays, sand, natural mineral matter, carbon black, graphite, kaolin, environmental dust, etc.

As used herein, the term "substantially free" refers to compositions completely lacking the component or having such a small amount of the component that the component does not affect the performance of the composition. The component may be present as an impurity or as a contaminant and shall be less than 0.5 wt. %. In another embodiment, the amount of the component is less than 0.1 wt. % and in yet another embodiment, the amount of component is less than 0.01 wt. %.

As used herein, the term "sulfate-free" or "substantially sulfate-free" refers to a composition, mixture, or ingredient that does not contain sulfate or a sulfate-containing compound, such as a sulfated surfactant, or to which sulfate or a sulfate-containing compound has not been added. Should sulfate or a sulfate-containing compound be present through contamination of a sulfate-free composition, mixture, or ingredients, the amount of phosphorus shall be less than 1 wt. %, preferably less than 0.5 wt. %, more preferably less than 0.3 wt. %, and most preferably less than 0.1 wt. %.

The term "water conditioning agent" refers to a compound that inhibits crystallization of water hardness ions from solution or disperses mineral scale including but not limited to calcium carbonate. Water conditioning agents include but are not limited to polyacrylic acids, polymethacrylic acids, olefin/maleic copolymers, polyacrylate alkali metal salts, polymethacrylate alkali metal salts and olefin/maleate alkali metal salts and the like.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polycarbonate polymers (PC), acrilonitrile-butadiene-styrene polymers (ABS), and polysulfone polymers (PS). Another exemplary plastic that can be cleaned using the compounds and compositions of the invention include polyethylene terephthalate (PET).

The terms "water soluble" and "water dispersible" as used herein, means that the polymer is soluble or dispersible in water in the inventive compositions. In general, the polymer should be soluble or dispersible at 25° C. at a concentration of 0.0001% by weight of the water solution and/or water carrier, preferably at 0.001%, more preferably at 0.01% and most preferably at 0.1%.

The term "weight percent," "wt. %," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt. %," etc.

The methods, systems, apparatuses, and compositions of the present invention can comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

Compositions

The solid rinse aid compositions include a defoamer component, a polyacrylic acid homopolymer or alkali metal salts thereof, a sheeting agent, and a solidification agent. In some embodiments, the solid rinse aid compositions can include a hydroxycarboxylic acid, a preservative, and water. Additional functional ingredients can be added to the composition to achieve desired properties and suitable for particular uses. The solid rinse aid compositions are substantially free of sulfates and/or sulfate containing compounds. In a preferred embodiment the solid rinse aid compositions do not contain any sulfates and/or sulfate containing compounds, except in trivial amounts as a contaminant.

In an aspect, the compositions include from about 1 wt. % to about 60 wt. % defoamer, from about 0.01 wt. % to about 40 wt. % polyacrylic acid homopolymer or alkali metal salt thereof, from about 1 wt. % to about 45 wt. % sheeting agent, and from about 10 wt. % to about 80 wt. % solidification agent. Preferably the compositions include from about 5 wt. % to about 50 wt. % defoamer, from about 1 wt. % to about 15 wt. % polyacrylic acid homopolymer or alkali metal salts thereof, from about 1 wt. % to about 35 wt. % sheeting agent, and from about 20 wt. % to about 75 wt. % solidification agent. In a most preferred embodiment the compositions include from about 8 wt. % to about 35 wt. % defoamer, from about 1 wt. % to about 10 wt. % polyacrylic acid homopolymer or alkali metal salt thereof, from about 1 wt. % to about 25 wt. % sheeting agent, and from about 25 wt. % to about 70 wt. % solidification agent. Without being limited according to the invention, all ranges recited are inclusive of the numbers defining the range and include each integer within the defined range.

Defoamer Component

The solid rinse aid composition can also include an effective amount of defoamer component configured for reducing the stability of foam that may be created by the alcohol ethoxylate sheeting agent in an aqueous solution. Any of a broad variety of suitable defoamers may be used, for example, any of a broad variety of nonionic ethylene oxide (EO) containing surfactants. Many nonionic ethylene oxide derivative surfactants are water soluble and have cloud points below the intended use temperature of the rinse aid composition, and therefore may be useful defoaming agents. In addition, where the solid rinse aid composition is preferred to be biodegradable, the defoamers are also selected to be biodegradable.

While not wishing to be bound by theory, it is believed that suitable nonionic EO containing surfactants are hydrophilic and water soluble at relatively low temperatures, for example, temperatures below the temperatures at which the rinse aid will be used. It is theorized that the EO component forms hydrogen bonds with the water molecules, thereby solubilizing the surfactant. However, as the temperature is increased, these hydrogen bonds are weakened, and the EO containing surfactant becomes less soluble, or insoluble in water. At some point, as the temperature is increased, the cloud point is reached, at which point the surfactant precipitates out of solution, and functions as a defoamer. The surfactant can therefore act to defoam the sheeting agent component when used at temperatures at or above this cloud point.

The cloud point of nonionic surfactant of this class is defined as the temperature at which a 1 wt. % aqueous solution. Therefore, the surfactant and/or surfactants chosen for use in the defoamer component can include those having appropriate cloud points that are below the intended use temperature of the rinse aid. A nonionic surfactant with an unacceptably high cloud point temperature or an unacceptably high molecular weight would either produce unacceptable foaming levels or fail to provide adequate defoaming capacity in a rinse aid composition. Thus, surfactants with appropriate cloud points can be selected for use as defoamers based on the intended use temperature of the rinse aid.

For example, there are two general types of rinse cycles in commercial warewashing machines. A first type of rinse cycle can be referred to as a hot water sanitizing rinse cycle because of the use of generally hot rinse water (about 180° F.). A second type of rinse cycle can be referred to as a chemical sanitizing rinse cycle and it uses generally lower temperature rinse water (about 120° F.). A surfactant useful as a defoamer in these two conditions is one having a cloud point less than the rinse water temperature. Accordingly, in this example, the highest useful cloud point, measured using a 1 wt. % aqueous solution, for the defoamer is approximately 180° F. or less. It should be understood, however, that the cloud point can be lower or higher, depending on the use locus water temperature. For example, depending upon the use locus water temperature, the cloud point may be in the range of about 0 to about 100° C. Some examples of common suitable cloud points may be in the range of about 50° C. to about 80° C., or in the range of about 60° C. to about 70° C.

Some examples of ethylene oxide derivative surfactants that may be used as defoamers include polyoxyethylene-polyoxypropylene block copolymers, alcohol alkoxylates, low molecular weight EO containing surfactants, or the like, or derivatives thereof. Some examples of polyoxyethylene-polyoxypropylene block copolymers include those having the following formulae:

$(EO)_x(PO)_y(EO)_x$ $(PO)y(EO)_x(PO)_y$ $(PO)_y(EO)_x(PO)_y(EO)_x(PO)_y$

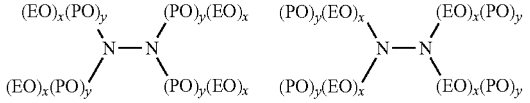

wherein EO represents an ethylene oxide group, PO represents a propylene oxide group, and x and y reflect the average molecular proportion of each alkylene oxide monomer in the overall block copolymer composition. In some embodiments, x is in the range of about 1 to about 130, y is in the range of about 5 to about 70, and x plus y is in the range of about 5 to about 200. It should be understood that each x and y in a molecule can be different. In some embodiments, the total polyoxyethylene component of the block copolymer can be in the range of at least about 20 mol-% of the block copolymer and in some embodiments, in the range of at least about 30 mol-% of the block copolymer. In some embodiments, the material can have a molecular weight greater than about 400, and in some embodiments, greater than about 500. For example, in some embodiments, the material can have a molecular weight in the range of about 500 to about 7000 or more, or in the range of about 950 to about 4000 or more, or in the range of about 1000 to about 3100 or more, or in the range of about 2100 to about 6700 or more.

Although the exemplary polyoxyethylene-polyoxypropylene block copolymer structures provided above have 3-8 blocks, it should be appreciated that the nonionic block copolymer surfactants can include more or less than 3-8 blocks. In addition, the nonionic block copolymer surfactants can include additional repeating units such as butylene oxide repeating units. Furthermore, the nonionic block copolymer surfactants that can be used according to the invention can be characterized hetero-polyoxyethylene-polyoxypropylene block copolymers. Some examples of suitable block copolymer surfactants include commercial products such as PLURONIC® and TETRONIC® surfactants, commercially available from BASF. For example, PLURONIC® 25-R4 is one example of a useful block copolymer surfactant commercially available from BASF, that is biodegradable and GRAS.

The defoamer component can comprise in the range of 1 to about 60 wt. % of the total composition, in some embodiments in the range of about 5 to about 50 wt. % of the total composition, in some embodiments in the range of about 10 to about 35 wt. % of the total composition.

The amount of defoamer component present in the composition can also be dependent upon the amount of sheeting agent present in the composition. For example, the less sheeting agent present in the composition may provide for the use of less defoamer component. In some example embodiments, the ratio of weight-percent sheeting agent component to weight-percent defoamer component may be in the range of about 1:5 to about 5:1, or in the range of about 1:3 to about 3:1. Those of skill in the art will recognize that the ratio of sheeting agent component to defoamer component may be dependent on the properties of either and/or both actual components used, and these ratios may vary from the example ranges given to achieve the desired defoaming effect. Defoamer components are also described in U.S. Pat. No. 7,279,455, assigned to Ecolab, herein incorporated by reference.

Hydroxycarboxylic Acid

The solid rinse aid composition can also include a hydroxycarboxylic acid or salt of thereof. Suitable hydroxycarboxylic acids and their salts for use in the solid rinse aid compositions include, citric, lactic, gluconic and acetic acids and combinations and/or alkali metal salts thereof. The hydroxycarboxylic acids or alkali metal salts thereof may be added to or be present in the composition in either the anhydrous or hydrated form or combinations thereof. When a hydroxycarboxylic acid is included in the solid rinse aid compositions, it can be present from about 0.1 to about 20 wt. %; preferably from about 1 to about 18 wt. %; more preferably from about 5 to about 15 wt. %; and even more preferably from about 8 to about 12 wt. %.

Polyacrylic Acid Homopolymer

The solid rinse aid compositions include a polyacrylic acid homopolymer or alkali metal salt thereof, i.e., sodium polyacrylate. The polyacrylic acid homopolymers can contains a polymerization unit derived from the monomer selected from the group consisting of acrylic acid, methacrylic acid, methyl acrylate, methyl methacrylate, ethyl acrylate, ethyl methacrylate, butyl acrylate, butyl methacrylate, iso-butyl acrylate, iso-butyl methacrylate, iso-octyl acrylate, iso-octyl methacrylate, cyclohexyl acrylate, cyclohexyl methacrylate, glycidyl acrylate, glycidyl methacrylate, hydroxyethyl acrylate, hydroxypropyl acrylate, 2-hydroxyethyl acrylate, 2-hydroxyethyl methacrylate, 2-hydroxypropyl acrylate, 2-hydroxypropyl methacrylate. and hydroxypropyl methacrylate and a mixture thereof, among which acrylic acid. methacrylic acid, methyl acrylate, methyl methacrylate, butyl acrylate, butyl methacrylate, iso-butyl acrylate, iso-butyl methacrylate, hydroxyethyl acrylate, 2-hydroxyethyl acrylate, 2-hydroxyethyl methacrylate, 2-hydroxypropyl acrylate, and 2-hydroxypropyl methacrylate, and a mixture thereof are preferred.

Preferred are polyacrylic acids, $(C_3H_4O_2)_n$ or 2-Propenoic acid homopolymers; Acrylic acid polymer; Poly(acrylic acid); Propenoic acid polymer; PAA have the following structural formula:

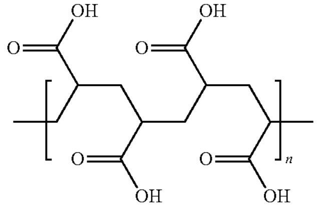

where n is any integer.

One source of commercially available polyacrylates (polyacrylic acid homopolymers) useful for the invention includes the Acusol 445 series from The Dow Chemical Company, Wilmington Delaware, USA, including, for example, Acusol® 445 (acrylic acid polymer, 48% total solids) (4500 MW), Acusol® 445N (sodium acrylate homopolymer, 45% total solids)(4500MW), and Acusol®445ND (powdered sodium acrylate homopolymer, 93% total solids)(4500MW) Other polyacrylates (polyacrylic acid homopolymers) commercially available from Dow Chemical Company suitable for the invention include, but are not limited to Acusol 929 (10,000 MW) and Acumer 1510. Yet another example of a commercially available polyacrylic acid is AQUATREAT AR-6 (100,000 MW) from AkzoNobel Strawinskylaan 2555 1077 ZZ Amsterdam Postbus 75730 1070 AS Amsterdam. Other suitable polyacrylates (polyacrylic acid homopolymers) for use in the invention include, but are not limited to those obtained from additional suppliers such as Aldrich Chemicals, Milwaukee, Wis., and ACROS Organics and Fine Chemicals, Pittsburgh, Pa, BASF Corporation and SNF Inc.

The polyacrylic acid homopolymer is present in the solid rinse aid compositions from about 1 to about 40 wt. %; preferably from about 1 to about 15 wt. %; more preferably from about 1 to about 10 wt. %. The polyacrylic acid polymer or alkali metal thereof may be added to the rinse aid composition as an aqueous solution, powder, granular, solid or paste.

Preservative

The solid rinse aid composition can also include effective amount of a preservative. Often, overall acidity and/or acids in the solid rinse aid composition can provide a preservative and stabilizing function. Some embodiments of the inventive solid rinse aid composition also include a GRAS preservative system for acidification of the solid rinse aid including sodium bisulfate and organic acids. In at least some embodiments, the solid rinse aid has pH of 2.0 or less and the use solution of the solid rinse aid has a pH of at least pH 4.0. In some embodiments, sodium bisulfate is included in the solid rinse aid composition as an acid source. In other embodiments, an effective amount of sodium bisulfate and one or more other acids are included in the solid rinse aid composition as a preservative system. Suitable acids include for example, inorganic acids, such as HCl and organic acids. In certain further embodiments, an effective amount of sodium bisulfate and one or more organic acids are included in the solid rinse aid composition as a preservative system. Suitable organic acids include sorbic acid, benzoic acid, ascorbic acid, erythorbic acid, citric acid, etc. Preferred organic acids include benzoic and ascorbic acid. Generally, effective amounts of sodium bisulfate with or without additional acids are included such that a use solution of the solid rinse aid composition has a pH that shall be less than pH 4.0, often less pH 3.0, and may be even less than pH 2.0.

Preferred preservatives for use in the solid rinse aid compositions include, methylchloroisothiazolinone, methylisothiazolinone, or a blend of the same. A blend of methylchloroisothiazolinone and methylisothiazolinone is available from Dow Chemical under the trade name KATHON™ CG. Additional preferred preservatives include salts of pyrithione, including, for example sodium pyrithione.

When a preservative is included in the solid rinse aid compositions, it can be present from about 0.01 to about 5 wt. %; preferably from about 0.05 to about 3 wt. %; more preferably from about 0.1 to about 2 wt. %; and even more preferably from about 0.1 to about 1 wt. %.

Sheeting Agent

The solid rinse aid composition includes sheeting agent. The sheeting agent of the solid rinse aid composition includes an effective amount of one or more alcohol ethoxylate compounds. Typically, the sheeting agent of the solid rinse aid composition includes an effective amount of one or more alcohol ethoxylate compounds that include an alkyl group that has 20 or fewer carbon atoms. Typically, the blend of one or more alcohol ethoxylate compounds in the sheeting agent is a solid at room temperature, for example by having a melting point equal to or greater than 100° F., often greater than 110° F., and frequently in the range of 110° F. to 120° F. In at least some embodiments, alcohol ethoxylate compounds may each independently have structure represented by Formula I:

$$R—O—(CH_2CH_2O)_n—H \quad (I)$$

wherein R is a linear or branched ($C_1$-$C_{18}$) alkyl group and n is an integer in the range of 1 to 100. In some embodiments, R may be a linear or branched ($C_8$-$C_{15}$) alkyl group, or may be a ($C_8$-$C_{10}$) alkyl group. Similarly, in some embodiments, n is an integer in the range of 1 to 50, or in the range of 1 to 35, or in the range of 1 to 25. In some embodiments, the one or more alcohol ethoxylate compounds are straight chain hydrophobes.

In at least some embodiments, the sheeting agent includes at least two different alcohol ethoxylate compounds each having structure represented by Formula I. In other words, the R and/or n variables of Formula I, or both, may be different in the two or more different alcohol ethoxylate compounds present in the sheeting agent. For example, the sheeting agent in some embodiments may include a first alcohol ethoxylate compound in which R is a linear or branched ($C_8$-$C_{10}$) alkyl group, and a second alcohol ethoxylate compound in which R is a linear or branched ($C_{10}$-$C_{12}$) alkyl group.

In some embodiments where, for example, the sheeting agent includes at least two different alcohol ethoxylate compounds, the ratio of the different alcohol ethoxylate compounds can be varied to achieve the desired characteristics of the final composition. For example, in some embodiments including a first alcohol ethoxylate compound and a second alcohol ethoxylate compound, the ratio of weight-percent first alcohol ethoxylate compound to weight-percent second compound may be in the range of about 1:1 to about 10:1 or more. For example, in some embodiments, the sheeting agent can include in the range of about 50 weight percent or more of the first compound, and in the range of about 50 weight percent or less of the second compound, and/or in the range of about 75 weight percent or more of the first compound, and in the range of about 25 weight percent or less of the second compound, and/or in the range of about 85 weight percent or more of the first compound, and in the range of about 15 weight percent or less of the second compound. Similarly, the range of mole ratio of the first compound to the second compound may be about 1:1 to about 10:1, and in some embodiments, in the range of about 3:1 to about 9:1.

In some embodiments, the alcohol ethoxylates used in the sheeting agent can be chosen such that they have certain characteristics, for example, are environmentally friendly, are suitable for use in food service industries, and/or the like. For example, the particular alcohol ethoxylates used in the sheeting agent may meet environmental or food service regulatory requirements, for example, biodegradability requirements.

Some specific examples of suitable sheeting agents that may be used include an alcohol ethoxylate combination including a first alcohol ethoxylate wherein R is a linear or branched $C_{10}$ alkyl group and n is 21 (i.e. 21 moles ethylene oxide) and a second alcohol ethoxylate wherein R is a $C_{12}$ alkyl group and again, n is 21 (i.e. 21 moles ethylene oxide). Such a combination can be referred to as an alcohol ethoxylate $C_{10-12}$, 21 moles EO. In some particular embodiments, the sheeting agent may include in the range of about 85 wt. % or more of the $C_{10}$ alcohol ethoxylate and about 15 wt. % or less of the $C_{12}$ alcohol ethoxylate. For example, the sheeting agent may include in the range of about 90 wt. % of the $C_{10}$ alcohol ethoxylate and about 10 wt. % of the $C_{12}$ alcohol ethoxylate. One example of such an alcohol ethoxylate mixture is commercially available from Sasol under the trade name NOVEL II 1012-21. Alcohol ethoxylate surfactants are also described in U.S. Pat. No. 7,279,455, assigned to Ecolab, herein incorporated by reference.

The sheeting agent can comprise a very broad range of weight percent of the entire composition, depending upon the desired properties. For example, for concentrated embodiments, the sheeting agent can comprise in the range of 1 to about 45 wt. % of the total composition, in some embodiments in the range of about 1 to about 35 wt. % of the total composition, in some embodiments in the range of about 1 to about 25 wt. % of the total composition.

Solidification Agent

In some embodiments, one or more solidification agents may be included in the rinse aid composition. Examples of hardening agents include urea, an amide such stearic monoethanolamide or lauric diethanolamide or an alkylamide, and the like; sulfate salts or sulfated surfactants, and aromatic sulfonates, and the like; a solid polyethylene glycol, or a solid EO/PO block copolymer, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the rinse aid and/or other active ingredients may be dispensed from the solid composition over an extended period of time.

Suitable aromatic sulfonates include, but are not limited to, sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and/or sodium butyl naphthalene. Preferred aromatic sulfonates include sodium xylene sulfonate and sodium cumene sulfonate The amount of solidification agent included in a rinse aid composition can be dictated by the desired effect. In general, an effective amount of solidification agent is considered an amount that acts with or without other materials to solidify the rinse aid composition. In embodiments seeking only to modify the viscosity and not solidify the rinse aid composition, an effective amount is considered an amount that acts with or without other materials to achieve the desired viscosity. Typically, for solid embodiments, the amount of solidification agent in a rinse aid composition is in a range of about 10 to about 80% by weight of the rinse aid composition, preferably in the range of about 20 to about 75% by weight more preferably in the range of about 20 to about 70% by weight of the rinse aid composition. In an aspect of the invention, the solidification agent is substantially free of sulfate. For example, the rinse aid may have less than 1 wt. % sulfate, preferably less than 0.5 wt. %, more preferably less than 0.1 wt. %. In a preferred embodiment the rinse aid is free of sulfate.

In certain embodiments it can be desirable to have a secondary solidification agent. In compositions containing secondary solidification the composition may include a secondary solidification agent in an amount in the range of up to about 30 wt. %. In some embodiments, secondary hardening agents are may be present in an amount in the range of about 5 to about 25 wt. %, often in the range of about 10 to about 25 wt. %, and sometimes in the range of about 5 to about 15 wt.-%.

The solidification process can last from a few minutes to about four hours, depending, for example, on the size of the cast, extruded or pressed composition, the ingredients of the composition, the temperature of the composition, and other like factors. Typically, the rinse aid composition of the present disclosure exhibits extended mix time capability. Often, the cast, extruded or pressed composition "sets up" or begins to harden to a solid form within 1 minute to about 3 hours. For example, the cast or extruded composition "sets up" or begins to harden to a solid form within a range of 1 minute to 2 hours. In some instances, the cast or extruded composition "sets up" or begins to harden to a solid form with a range of 1 minute to about 20 minutes.

Water

The solid rinse aid (i.e., solid concentrate) can include water. Water can be independently added to the rinse aid composition or can be provided in the rinse aid composition as a result of its presence in an aqueous material that is added to the rinse aid composition. For example, materials added to the rinse aid composition include water or can be prepared in an aqueous premix available for reaction with the solidification agent component(s). Water introduced in the rinse aid composition during formation of the rinse aid composition can be removed or become water of hydration. Typically, water is introduced into the rinse aid composition to provide the detergent composition with a desired viscosity prior to solidification, and/or to provide a desired rate of solidification, and/or as a processing aid.

The components used to form the solid composition can include water as hydrates or hydrated forms of the solidification agent, hydrates or hydrated forms of any of the other ingredients, and/or added aqueous medium as an aid in processing. It is expected that the aqueous medium will help provide the components with a desired viscosity for processing. In addition, it is expected that the aqueous medium may help in the solidification process when forming the solid rinse aid compositions.

In the solid rinse aid composition, the amount of water can be in the range of about 1 to about 15 wt. %, often in the range of about 3 to about 14 wt. %, but can be about 3 to about 10 wt. % water, or about 10 to about 15 wt. % water. In a preferred embodiment, the water can be provided as deionized water or as softened water.

Additional Functional Ingredients

In embodiments of the invention, additional functional ingredients can be included in the solid rinse aid compositions. The functional ingredients provide desired properties and functionalities to the compositions. For the purpose of this application, the term "functional ingredient" includes a material that provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning, specifically ware wash applications. However, other embodiments may include functional ingredients for use in other applications. Examples of such a functional material include chelating/sequestering agents; bleaching agents or activators; sanitizers/anti-microbial agents; activators; builder or fillers; anti-redeposition agents; optical brighteners; dyes; odorants or perfumes; preservatives; stabilizers; processing aids; corrosion inhibitors; fillers; solidifiers; hardening agent; solubility modifiers; pH adjusting agents; humectants; hydrotropes; or a broad variety of other functional materials, depending upon the desired characteristics and/or functionality of the composition. In the context of some embodiments disclosed herein, the functional materials, or ingredients, are optionally included within the solid rinse aids for their functional properties. Some more particular examples of functional materials are discussed in more detail below, but it should be understood by those of skill in the art and others that the particular materials discussed are given by way of example only, and that a broad variety of other functional materials may be used.

Activators

In some embodiments, the antimicrobial activity or bleaching activity of the rinse aid can be enhanced by the addition of a material which, when the composition is placed in use, reacts with the active oxygen to form an activated component. For example, in some embodiments, a peracid or a peracid salt is formed. For example, in some embodiments, tetraacetylethylene diamine can be included within the composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine; transition metal; compound that includes carboxylic, nitrile, amine, or ester moiety; or mixtures thereof.

In some embodiments, an activator component can include in the range of up to about 75% by wt. of the composition, in some embodiments, in the range of about 0.01 to about 20% by wt., or in some embodiments, in the range of about 0.05 to 10% by wt. of the composition. In some embodiments, an activator for an active oxygen compound combines with the active oxygen to form an antimicrobial agent.

In some embodiments, the rinse aid composition includes a solid, such as a solid flake, pellet, or block, and an activator material for the active oxygen is coupled to the solid. The activator can be coupled to the solid by any of a variety of methods for coupling one solid cleaning composition to another. For example, the activator can be in the form of a solid that is bound, affixed, glued or otherwise adhered to the solid of the rinse aid composition. Alternatively, the solid activator can be formed around and encasing the solid rinse aid composition. By way of further example, the solid activator can be coupled to the solid rinse aid composition by the container or package for the composition, such as by a plastic or shrink wrap or film.

Additional Hardening Solidification Agents Solubility Modifiers

In some embodiments, one or more additional hardening agents may be included in the solid rinse aid composition if desired. Examples of hardening agents include an amide such stearic monoethanolamide or lauric diethanolamide, or an alkylamide, and the like; a solid polyethylene glycol, or a solid EO/PO block copolymer, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the rinse aid and/or other active ingredients may be dispensed from the solid composition over an extended period of time. The composition may include a secondary hardening agent in an amount in the range of up to about 30 wt. %. In some embodiments, secondary hardening agents are may be present in an amount in the range of about 5 to about 25 wt. %, often in the range of about 10 to about 25 wt. %, and sometimes in the range of about 5 to about 15 wt. %.

Additional Sheeting Aids

The solid rinse aid compositions can optionally include one or more additional rinse aid components, for example, an additional wetting or sheeting agent components in addition to the alcohol ethoxylate component discussed above. For example, water soluble or dispersible low foaming organic material capable of aiding in reducing the surface tension of the rinse water to promote sheeting action and/or to aid in reducing or preventing spotting or streaking caused by beaded water after rinsing is complete may also be included. Such sheeting agents are typically organic surfactant like materials having a characteristic cloud point. Surfactants useful in these applications are aqueous soluble surfactants having a cloud point greater than the available hot service water, and the cloud point can vary, depending on the use locus hot water temperature and the temperature and type of rinse cycle.

Some examples of additional sheeting agents can typically comprise a polyether compound prepared from ethylene oxide, propylene oxide, or a mixture in a homopolymer or block or hetero-copolymer structure. Such polyether compounds are known as polyalkylene oxide polymers, polyoxyalkylene polymers or polyalkylene glycol polymers. Such sheeting agents require a region of relative hydrophobicity and a region of relative hydrophilicity to provide surfactant properties to the molecule. Such sheeting agents can have a molecular weight in the range of about 500 to 15,000. Certain types of (PO)(EO) polymeric rinse aids have been found to be useful containing at least one block of poly(PO) and at least one block of poly(EO) in the polymer molecule. Additional blocks of poly(EO), poly (PO) or random polymerized regions can be formed in the molecule. Particularly useful polyoxypropylene polyoxyethylene block copolymers are those comprising a center block of polyoxypropylene units and blocks of polyoxyethylene units to each side of the center block. Such polymers have the formula shown below:

$$(EO)_n—(PO)_m-(EO)_n$$

wherein m is an integer of 20 to 60, and each end is independently an integer of 10 to 130. Another useful block copolymer are block copolymers having a center block of polyoxyethylene units and blocks of polyoxypropylene to each side of the center block. Such copolymers have the formula:

$$(PO)_n-(EO)_m—(PO)_n$$

wherein m is an integer of 15 to 175, and each end are independently integers of about 10 to 30. For solid compositions, a hydrotrope may be used to aid in maintaining the solubility of sheeting or wetting agents. Hydrotropes can be used to modify the aqueous solution creating increased solubility for the organic material. In some embodiments, hydrotropes are low molecular weight aromatic sulfonate materials such as xylene sulfonates and dialkyldiphenyl oxide sulfonate materials.

Anti-Redeposition Agents

The rinse aid composition can optionally include an anti-redeposition agent capable of facilitating sustained suspension of soils in a rinse solution and preventing removed soils from being redeposited onto the substrate being rinsed. Some examples of suitable anti-redeposition agents can include fatty acid amides, fluorocarbon surfactants, complex phosphate esters, styrene maleic anhydride copolymers, and cellulosic derivatives such as hydroxyethyl cellulose, hydroxypropyl cellulose, and the like. A rinse aid composition can include up to about 10 wt. %, and in some embodiments, in the range of about 1 to about 5 wt. %, of an anti-redeposition agent.

Bleaching Agents

The rinse aid can optionally include bleaching agent. Bleaching agent can be used for lightening or whitening a substrate, and can include bleaching compounds capable of liberating an active halogen species, such as $Cl_2$, $Br_2$, $—OCl^-$ and/or $—OBr^-$, or the like, under conditions typically encountered during the cleansing process. Suitable bleaching agents for use can include, for example, chlorine-containing compounds such as a chlorine, a hypochlorite, chloramines, of the like. Some examples of halogen-releasing compounds include the alkali metal dichloroisocyanurates, chlorinated trisodium phosphate, the alkali metal hypochlorites, monochloramine and dichloroamine, and the like. Encapsulated chlorine sources may also be used to enhance the stability of the chlorine source in the composition (see, for example, U.S. Pat. Nos. 4,618,914 and 4,830,773, the disclosures of which are incorporated by reference herein). A bleaching agent may also include an agent containing or acting as a source of active oxygen. The active oxygen compound acts to provide a source of active oxygen, for example, may release active oxygen in aqueous solutions. An active oxygen compound can be inorganic or organic, or can be a mixture thereof. Some examples of active oxygen compound include peroxygen compounds, or peroxygen compound adducts. Some examples of active oxygen compounds or sources include hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like. A rinse aid composition may include a minor but effective amount of a bleaching agent, for example, in some embodiments, in the range of up to about 10 wt. %, and in some embodiments, in the range of about 0.1 to about 6 wt. %.

Chelating/Sequestering Agents

The solid rinse aid composition may also include effective amounts of chelating/sequestering agents, also referred to as builders. In addition, the rinse aid may optionally include one or more additional builders as a functional ingredient. In general, a chelating agent is a molecule capable of coordinating (i.e., binding) the metal ions commonly found in water sources to prevent the metal ions from interfering with the action of the other ingredients of a rinse aid or other cleaning composition. The chelating/sequestering agent may also function as a water conditioning agent when included in an effective amount. In some embodiments, a solid rinse aid can include in the range of up to about 70 wt. %, or in the range of about 1-60 wt. %, of a chelating/sequestering agent.

Often, the solid rinse aid composition is also phosphate-free and/or sulfate-free. In embodiments of the solid rinse aid composition that are phosphate-free, the additional functional materials, including builders exclude phosphorous-containing compounds such as condensed phosphates and phosphonates.

Suitable additional builders include aminocarboxylates and polycarboxylates. Some examples of aminocarboxylates useful as chelating/sequestering agents, include, N-hydroxyethyliminodiacetic acid, nitrilotriacetic acid (NTA), ethylenediaminetetraacetic acid (EDTA), N-hydroxyethyl-ethylenediaminetriacetic acid (HEDTA) (in addition to the HEDTA used in the binder), diethylenetriaminepentaacetic acid (DTPA), and the like. Some examples of polymeric polycarboxylates suitable for use as sequestering agents include those having a pendant carboxylate ($—CO_2$) groups and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like.

In embodiments of the solid rinse aid composition which are not phosphate-free, added chelating/sequestering agents may include, for example a condensed phosphate, a phosphonate, and the like. Some examples of condensed phosphates include sodium and potassium orthophosphate, sodium and potassium pyrophosphate, sodium tripolyphosphate, sodium hexametaphosphate, and the like. A condensed phosphate may also assist, to a limited extent, in solidification of the composition by fixing the free water present in the composition as water of hydration.

In embodiments of the solid rinse aid composition which are not phosphate-free, the composition may include a phosphonate such as 1-hydroxyethane-1,1-diphosphonic acid $CH_3C(OH)[PO(OH)_2]_2$; aminotri(methylenephosphonic acid) $N[CH_2PO(OH)_2]_3$; aminotri(methylenephosphonate), sodium salt

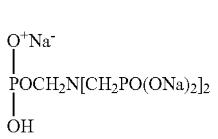

2-hydroxyethyliminobis(methylenephosphonic acid) $HOCH_2CH_2N[CH_2PO(OH)_2]_2$; diethylenetriaminepenta(methylenephosphonic acid) $(HO)_2POCH_2N[CH_2CH_2N[CH_2PO(OH)_2]_2]_2$; diethylenetriaminepenta(methylenephosphonate), sodium salt $C_9H_{(28-x)}N_3Na_xO_{15}P_5$ (x=7); hexamethylenediamine(tetramethylenephosphonate), potassium salt $C_{10}H_{(28-x)}N_2K_xO_{12}P_4$ (x=6); bis(hexamethylene)triamine(pentamethylenephosphonic acid) $(HO_2)POCH_2N[(CH_2)_6N[CH_2PO(OH)_2]_2]_2$; and phosphorus acid $H_3PO_3$. In some embodiments, a phosphonate combination such as ATMP and DTPMP may be used. A neutralized or alkaline phosphonate, or a combination of the phosphonate with an alkali source prior to being added into the mixture such that there is little or no heat or gas generated by a neutralization reaction when the phosphonate is added can be used.

For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

Dyes/Odorants

Various dyes, odorants including perfumes, and other aesthetic enhancing agents may also be included in the solid rinse aid. Dyes may be included to alter the appearance of the composition, as for example, FD&C Blue 1 (Sigma Chemical), FD&C Yellow 5 (Sigma Chemical), Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the solid rinse aid compositions include, for example, terpenoids such as citronellol, aldehydes such as amyl cinnamaldehyde, a jasmine such as C1S-jasmine or jasmal, vanillin, and the like.

Fillers

The solid rinse aid can optionally include a minor but effective amount of one or more of a filler which does not necessarily perform as a rinse and/or cleaning agent per se, but may cooperate with a rinse agent to enhance the overall capacity of the composition. Some examples of suitable fillers may include sodium chloride, starch, sugars, $C_1$-$C_{10}$ alkylene glycols such as propylene glycol, and the like. In some embodiments, a filler can be included in an amount in the range of up to about 20 wt. %, and in some embodiments, in the range of about 1-15 wt. %.

Functional Polydimethylsiloxones

The solid rinse aid composition can also optionally include one or more functional polydimethylsiloxones. For example, in some embodiments, a polyalkylene oxide-modified polydimethylsiloxane, nonionic surfactant or a polybetaine-modified polysiloxane amphoteric surfactant can be employed as an additive. Both, in some embodiments, are linear polysiloxane copolymers to which polyethers or polybetaines have been grafted through a hydrosilation reaction. Some examples of specific siloxane surfactants are known as SILWET® surfactants available from Union Carbide or ABIL® polyether or polybetaine polysiloxane copolymers available from Goldschmidt Chemical Corp., and described in U.S. Pat. No. 4,654,161 which patent is incorporated herein by reference. In some embodiments, the particular siloxanes used can be described as having, e.g., low surface tension, high wetting ability and excellent lubricity. For example, these surfactants are said to be among the few capable of wetting polytetrafluoroethylene surfaces. The siloxane surfactant employed as an additive can be used alone or in combination with a fluorochemical surfactant. In some embodiments, the fluorochemical surfactant employed as an additive optionally in combination with a silane, can be, for example, a nonionic fluorohydrocarbon, for example, fluorinated alkyl polyoxyethylene ethanols, fluorinated alkyl alkoxylate and fluorinated alkyl esters.

Further description of such functional polydimethylsiloxones and/or fluorochemical surfactants are described in U.S. Pat. Nos. 5,880,088; 5,880,089; and 5,603,776, all of which patents are incorporated herein by reference. We have found, for example, that the use of certain polysiloxane copolymers in a mixture with hydrocarbon surfactants provides excellent rinse aids on plastic ware. We have also found that the combination of certain silicone polysiloxane copolymers and fluorocarbon surfactants with conventional hydrocarbon surfactants also provide excellent rinse aids on plastic ware. This combination has been found to be better than the individual components except with certain polyalkylene oxide-modified polydimethylsiloxanes and polybetaine polysiloxane copolymers, where the effectiveness is about equivalent. Therefore, some embodiments encompass the polysiloxane copolymers alone and the combination with the fluorocarbon surfactant can involve polyether polysiloxanes, the nonionic siloxane surfactants. The amphoteric siloxane surfactants, the polybetaine polysiloxane copolymers may be employed alone as the additive in the rinse aids to provide the same results.

In some embodiments, the composition may include functional polydimethylsiloxones in an amount in the range of up to about 10 wt. %. For example, some embodiments may include in the range of about 0.1 to 10 wt. % of a polyalkylene oxide-modified polydimethylsiloxane or a polybetaine-modified polysiloxane, optionally in combination with about 0.1 to 10 wt. % of a fluorinated hydrocarbon nonionic surfactant.

Humectant

The solid rinse aid composition can also optionally include one or more humectants. A humectant is a substance having an affinity for water. The humectant can be provided in an amount sufficient to aid in reducing the visibility of a film on the substrate surface. The visibility of a film on substrate surface is a particular concern when the rinse water contains in excess of 200 ppm total dissolved solids. Accordingly, in some embodiments, the humectant is provided in an amount sufficient to reduce the visibility of a film on a substrate surface when the rinse water contains in excess of 200 ppm total dissolved solids compared to a rinse agent composition not containing the humectant. The terms "water solids filming" or "filming" refer to the presence of a visible, continuous layer of matter on a substrate surface that gives the appearance that the substrate surface is not clean.

Some example humectants that can be used include those materials that contain greater than 5 wt. % water (based on dry humectant) equilibrated at 50% relative humidity and room temperature. Exemplary humectants that can be used include glycerin, propylene glycol, sorbitol, alkyl polyglycosides, polybetaine polysiloxanes, and mixtures thereof. In some embodiments, the rinse agent composition can include humectant in an amount in the range of up to about 75% based on the total composition, and in some embodiments, in the range of about 5 wt. % to about 75 wt. % based on the weight of the composition. In some embodiments, where humectant is present, the weight ratio of the humectant to the sheeting agent can be in the range of about 1:3 or greater, and in some embodiments, in the range of about 5:1 and about 1:3.

Sanitizers/Anti-Microbial Agents

The rinse aid can optionally include a sanitizing agent. Sanitizing agents also known as antimicrobial agents are chemical compositions that can be used in a solid functional material to prevent microbial contamination and deterioration of material systems, surfaces, etc. Generally, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds.

It should also be understood that active oxygen compounds, such as those discussed above in the bleaching agents section, may also act as antimicrobial agents, and can even provide sanitizing activity. In fact, in some embodiments, the ability of the active oxygen compound to act as an antimicrobial agent reduces the need for additional antimicrobial agents within the composition. For example, percarbonate compositions have been demonstrated to provide excellent antimicrobial action. Nonetheless, some embodiments incorporate additional antimicrobial agents.

The given antimicrobial agent, depending on chemical composition and concentration, may simply limit further proliferation of numbers of the microbe or may destroy all or a portion of the microbial population. The terms "microbes" and "microorganisms" typically refer primarily to bacteria, virus, yeast, spores, and fungus microorganisms. In use, the antimicrobial agents are typically formed into a solid functional material that when diluted and dispensed, optionally, for example, using an aqueous stream forms an aqueous disinfectant or sanitizer composition that can be contacted with a variety of surfaces resulting in prevention of growth or the killing of a portion of the microbial population. A three log reduction of the microbial population results in a sanitizer composition. The antimicrobial agent can be encapsulated, for example, to improve its stability.

Some examples of common antimicrobial agents include phenolic antimicrobials such as pentachlorophenol, ortho-phenylphenol, a chloro-p-benzylphenol, p-chloro-m-xylenol. Halogen containing antibacterial agents include sodium trichloroisocyanurate, sodium dichloro isocyanate (anhydrous or dihydrate), iodine-poly(vinylpyrolidinone) complexes, bromine compounds such as 2-bromo-2-nitropropane-1,3-diol, and quaternary antimicrobial agents such as benzalkonium chloride, didecyldimethyl ammonium chloride, choline diiodochloride, tetramethyl phosphonium tribromide. Other antimicrobial compositions such as hexahydro-1,3,5-tris(2-hydroxyethyl)-s-triazine, dithiocarbamates such as sodium dimethyldithiocarbamate, and a variety of other materials are known in the art for their antimicrobial properties.

In embodiments of the solid rinse aid composition which are phosphate-free, and/or sulfate-free, and also include an anti-microbial agent, the anti-microbial is selected to meet those requirements. Embodiments of the solid rinse aid composition which include only GRAS ingredients, may exclude or omit anti-microbial agents described in this section.

In some embodiments, the rinse aid composition comprises, an antimicrobial component in the range of up to about 10% by wt. of the composition, in some embodiments in the range of up to about 5 wt. %, or in some embodiments, in the range of about 0.01 to about 3 wt. %, or in the range of 0.05 to 1% by wt. of the composition.

Surfactants

In some embodiments, the compositions of the present invention include a surfactant. Surfactants suitable for use with the compositions of the present invention include, but are not limited to, nonionic surfactants, semipolar nonionic surfactants, cationic surfactants, amphoteric surfactants, and zwitterionic surfactants. In an aspect of the invention, the solid rinse aid compositions are free or substantially free of anionic surfactants. In some embodiments, the compositions of the present invention include about 0.01 wt. % to about 50 wt. % of a surfactant. In other embodiments the compositions of the present invention include about 1 wt. % to about 40 wt. % of a surfactant. In still yet other embodiments, the compositions of the present invention include about 10 wt. % to about 30 wt. % of a surfactant.

Nonionic Surfactants

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronic® manufactured by BASF Corp. Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Tetronic® compounds are tetra-flinctional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

2. Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

3. Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol™ manufactured by Shell Chemical Co. and Alfonic™ manufactured by Vista Chemical Co.

4. Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol™ manufactured by Henkel Corporation and Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of Nonionic Low Foaming Surfactants Include

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics™ are manufactured by BASF Corporation under the trade name Pluronic™ R surfactants. Likewise, the Tetronic™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional Examples of Effective Low Foaming Nonionics Include

7. The alkylphenoxypolyethoxyalkanols of U.S. Pat. No. 2,903,486 issued Sep. 8, 1959 to Brown et al. and represented by the formula

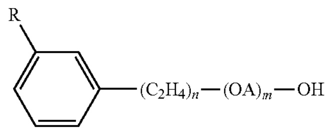

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

9. The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

10. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

12. Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $—(C_2H_4O)_XH$, where x is in the range of from 1 to 3.

13. A useful class of non-ionic surfactants includes the class defined as alkoxylated amines or, most particularly, alcohol alkoxylated/aminated/alkoxylated surfactants. These non-ionic surfactants may be at least in part represented by the general formulae: $R^{20}—(PO)_SN\text{-}(EO)_tH$, $R^{20}—(PO)_SN\text{-}(EO)_tH(EO)_tH$, and $R^{20}—N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}—(PO)_v—N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the invention include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Semi-Polar Nonionic Surfactants

The semi-polar type of nonionic surface active agents are another class of nonionic surfactant useful in compositions of the present invention. Generally, semi-polar nonionics are high foamers and foam stabilizers, which can limit their application in CIP systems. However, within compositional embodiments of this invention designed for high foam cleaning methodology, semi-polar nonionics would have immediate utility. The semi-polar nonionic surfactants include the amine oxides, phosphine oxides, sulfoxides and their alkoxylated derivatives.

14. Amine oxides are tertiary amine oxides corresponding to the general formula:

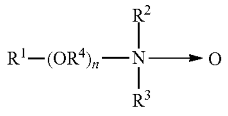

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof, $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants are selected from the coconut or tallow alkyl di-(lower alkyl)amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water soluble phosphine oxides having the following structure:

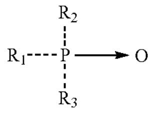

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water soluble sulfoxide compounds which have the structure:

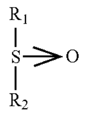

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl)amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 ($R-(EO)_5(PO)_4$) and Dehypon LS-36 ($R-(EO)_3(PO)_6$); and capped alcohol alkoxylates, such as Plurafac LF221 and Tegoten EC11; mixtures thereof, or the like.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y- and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

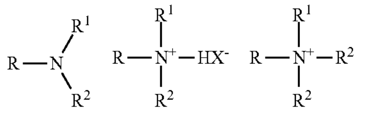

in which, R represents an alkyl chain, R', R", and R"' may be either alkyl chains or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present invention include those having the formula $R^1_mR^2_xY_LZ$ wherein each $R^1$ is an organic group containing a straight or branched alkyl or alkenyl group optionally substituted with up to three phenyl or hydroxy groups and optionally interrupted by up to four of the following structures:

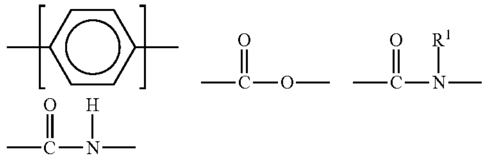

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens.

Y is can be a group including, but not limited to:

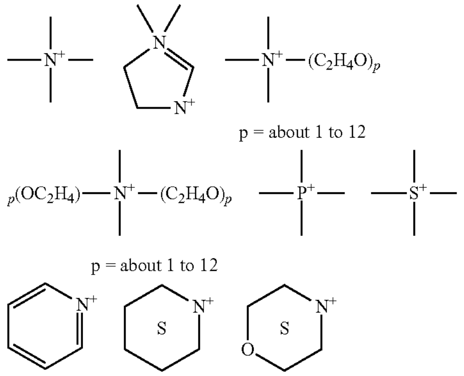

p = about 1 to 12 p = about 1 to 12 or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

(MONO)ACETATE (DI)PROPIONATE

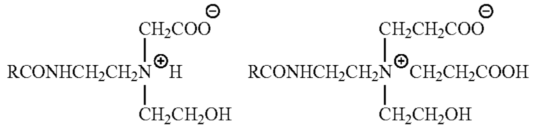

AMPHOTERIC SULFONATE

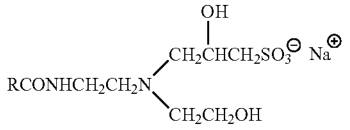

Neutral pH - Zwitterion wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R=C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof, and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+(CH_2$—$CH_2$—$CO_2Na)_2$—$CH_2$—$CH_2$—OH or $C_{12}$-alkyl-C(O)—N(H)—$CH_2$—$CH_2$—$N^+(CH_2$—$CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references is herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

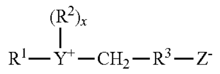

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

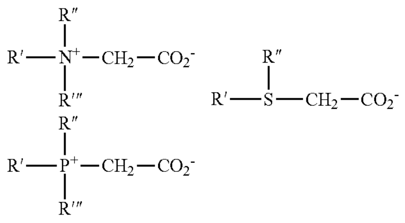

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references is herein incorporated in their entirety.

Other Ingredients

A wide variety of other ingredients useful in providing the particular composition being formulated to include desired properties or functionality may also be included. For example, the rinse aid may include other active ingredients, such as pH modifiers, buffering agents, cleaning enzyme, carriers, processing aids, or others, and the like.

Additionally, the rinse aid can be formulated such that during use in aqueous operations, for example in aqueous cleaning operations, the rinse water will have a desired pH. For example, compositions designed for use in rinsing may be formulated such that during use in aqueous rinsing operation the rinse water will have a pH in the range of about 3 to about 5, or in the range of about 5 to about 9. Techniques for controlling pH at recommended usage levels include the use of buffers, alkali sources, and acids. Such techniques can be applied to the solid rinse aid compositions if desired.

Processing and/or Manufacturing of the Composition

The invention also relates to a method of processing and/or making the solid rinse aid composition. The solid rinse aid composition is generally provided as a solid concentrate, e.g., block. In general, it is expected that the solid rinse aid composition will be diluted with water to provide the use solution that is then supplied to the surface of a substrate, for example, during a rinse cycle. The use solution preferably contains an effective amount of active material to provide reduced water solids filming in high solids containing water. The solid composition can also be prepared by extrudation techniques or compression techniques include tableting, forming, and pressing.

The solid rinse aid composition can be processed and formulated using conventional equipment and techniques. The desired amount of the sheeting agent component, the defoamer component, and polyacrylic acid homopolymer is provided, along with solidification agent, and any other ingredients, such as a preservative. The components are vigorously admixed and heated, typically in the range of 100 to 140° F. The vigorous admixing and heating may be performed in a TAMAR mixer or an extruder system or other similar equipment. The complete mixture is subsequently extruded into the desired form or cast into a mold, cooled or chilled. Molded forms may be removed from the molds or remain in the container (i.e. mold).

It should be understood that compositions and methods embodying the invention are suitable for preparing a variety of solid compositions, as for example, a cast, extruded, pressed, molded or formed solid pellet, block, tablet, and the like. In some embodiments, the solid composition can be formed to have a weight of 50 grams or less, while in other embodiments, the solid composition can be formed to have a weight of 50 grams or greater, 500 grams or greater, or 1 kilogram or greater. For the purpose of this application the term "solid block" includes cast, formed, extruded or pressed materials having a weight of 50 grams or greater. The solid compositions provide for a stabilized source of functional materials. In some embodiments, the solid composition may be dissolved, for example, in an aqueous or other medium, to create a concentrated and/or use solution. The solution may be directed to a storage reservoir for later use and/or dilution, or may be applied directly to a point of use.

The various liquid materials included in the rinse aid composition are adapted to a solid form by incorporating into the composition one or more additional solidification agents. Other examples of casting agents include polyethylene glycol, and nonionic polyethylene or polypropylene oxide polymer. In some embodiments, polyethylene glycols (PEG) are used in melt type solidification processing by uniformly blending the sheeting agent and other components with PEG at a temperature above the melting point of the PEG and cooling the uniform mixture.

In some embodiments, in the formation of a solid rinse aid composition, a mixing system may be used to provide for continuous mixing of the ingredients at high enough shear to form a substantially homogeneous solid or semi-solid mixture in which the ingredients are distributed throughout its mass. In some embodiments, the mixing system includes means for mixing the ingredients to provide shear effective for maintaining the mixture at a flowable consistency, with a viscosity during processing in the range of about 1,000-1,000,000 cP, or in the range of about 50,000-200,000 cP. In some example embodiments, the mixing system can be a continuous flow mixer or in some embodiments, an extruder, such as a single or twin screw extruder apparatus. A suitable amount of heat may be applied from an external source to facilitate processing of the mixture.

The mixture is typically processed at a temperature to maintain the physical and chemical stability of the ingredients. In some embodiments, the mixture is processed at temperatures in the range of about 100 to 140° F. In certain other embodiments, the mixture is processed at temperatures in the range of 110-125° F. Although limited external heat may be applied to the mixture, the temperature achieved by the mixture may become elevated during processing due to friction, variances in ambient conditions, and/or by an exothermic reaction between ingredients. Optionally, the temperature of the mixture may be increased, for example, at the inlets or outlets of the mixing system.

An ingredient may be in the form of a liquid or a solid such as a dry particulate, and may be added to the mixture separately or as part of a premix with another ingredient, as for example, the sheeting agent, the defoamer, an aqueous medium, and additional ingredients such as a hardening agent, and the like. One or more premixes may be added to the mixture.

The ingredients are mixed to form a substantially homogeneous consistency wherein the ingredients are distributed substantially evenly throughout the mass. The mixture can be discharged from the mixing system through a die or other shaping means. The profiled extrudate then can be divided into useful sizes with a controlled mass. Optionally, heating and cooling devices may be mounted adjacent to mixing apparatus to apply or remove heat in order to obtain a desired temperature profile in the mixer. For example, an external source of heat may be applied to one or more barrel sections of the mixer, such as the ingredient inlet section, the final outlet section, and the like, to increase fluidity of the mixture during processing. In some embodiments, the temperature of the mixture during processing, including at the discharge port, is maintained in the range of about 100 to 140° F.

The composition hardens due to the chemical or physical reaction of the requisite ingredients forming the solid. The solidification process may last from a few minutes to about six hours, or more, depending, for example, on the size of the cast or extruded composition, the ingredients of the composition, the temperature of the composition, and other like factors. In some embodiments, the cast or extruded composition "sets up" or begins to hardens to a solid form within about 1 minute to about 3 hours, or in the range of about 1 minute to about 2 hours, or in some embodiments, within about 1 minute to about 20 minutes.

In some embodiments, the extruded solid can be packaged, for example in a container or in film. The temperature of the mixture when discharged from the mixing system can be sufficiently low to enable the mixture to be cast or extruded directly into a packaging system without first cooling the mixture. The time between extrusion discharge and packaging may be adjusted to allow the hardening of the composition for better handling during further processing and packaging. In some embodiments, the mixture at the point of discharge is in the range of about 100 to 140° F. In certain other embodiments, the mixture is processed at temperatures in the range of 110-125° F. The composition is then allowed to harden to a solid form that may range from a low density, sponge-like, malleable, caulky consistency to a high density, fused solid, concrete-like solid.

An example cast solid rinse aid of the present invention may be prepared as follows: solvate the solidification agent in aqueous solution, add sheeting agent(s), defoamer(s), and heat while admixing to maintain as a liquid, e.g., 100-140° F. TEKMAR the mixture (e.g., vigorously mix). Cast into a form. Additional ingredients, such as preservatives and dyes may be added at any stage prior to final mixing and casting. Chill the form and pop-out the solid rinse aid composition.

In an alternative example, a liquid premix is prepared by heated admixing of water, sheeting agent, polyacrylic acid copolymer, and defoamer and separate preparation of a solidification agent. The solidification agent is admixed into the heated liquid premix, for example using an extruder. The final product is extruded and cooled.

Packaging System

The solid rinse aid composition can be, but is not necessarily, incorporated into a packaging system or receptacle. The packaging receptacle or container may be rigid or flexible, and include any material suitable for containing the compositions produced, as for example glass, metal, plastic film or sheet, cardboard, cardboard composites, paper, or the like. Rinse aid compositions may be allowed to solidify in the packaging or may be packaged after formation of the solids in commonly available packaging and sent to distribution center before shipment to the consumer.

For solids, advantageously, in at least some embodiments, since the rinse is processed at or near ambient temperatures, the temperature of the processed mixture is low enough so that the mixture may be cast or extruded directly into the container or other packaging system without structurally damaging the material. As a result, a wider variety of materials may be used to manufacture the container than those used for compositions that processed and dispensed under molten conditions. In some embodiments, the packaging used to contain the rinse aid is manufactured from a flexible, easy opening film material.

Dispensing/Use of the Rinse Aid

The rinse aid can be dispensed as a solid concentrate or as a use solution. In general, it is expected that the concentrate will be dissolved and diluted with water to provide the use solution that is then supplied to the surface to be cleaned. In some embodiments, the aqueous use solution may contain about 5 to about 2,000 parts per million (ppm), or about 10 ppm to about 1,000 ppm, or about 10 ppm to about 500 ppm of active materials, or in the range of about 10 to about 300 ppm, or in the range of about 10 to 200 ppm.

The use solution can be applied to the substrate during a rinse application, for example, during a rinse cycle, for example, in a warewashing machine, a car wash application, or the like. In some embodiments, formation of a use solution can occur from a rinse agent installed in a cleaning machine, for example onto a dish rack. The rinse agent can be diluted and dispensed from a dispenser mounted on or in the machine or from a separate dispenser that is mounted separately but cooperatively with the dish machine.

For example, in some embodiments, liquid rinse agents can be dispensed by incorporating compatible packaging containing the liquid material into a dispenser adapted to diluting the liquid with water to a final use concentration. Some examples of dispensers for the liquid rinse agent of the invention are DRYMASTER-P sold by Ecolab Inc., St. Paul, Minn.

In other example embodiments, solid products, such as cast or extruded solid compositions, may be conveniently dispensed by inserting a solid material in a container or with no enclosure into a spray-type dispenser such as the volume SOL-ET controlled ECOTEMP Rinse Injection Cylinder system manufactured by Ecolab Inc., St. Paul, Minn. Such a dispenser cooperates with a warewashing machine in the rinse cycle. When demanded by the machine, the dispenser directs a spray of water onto the cast solid block of rinse agent which effectively dissolves a portion of the block creating a concentrated aqueous rinse solution which is then fed directly into the rinse water forming the aqueous rinse. The aqueous rinse is then contacted with the dishes to affect a complete rinse. This dispenser and other similar dispensers are capable of controlling the effective concentration of the active portion in the aqueous rinse by measuring the volume of material dispensed, the actual concentration of the material in the rinse water (an electrolyte measured with an electrode) or by measuring the time of the spray on the cast block. In general, the concentration of active portion in the aqueous rinse is preferably the same as identified above for liquid rinse agents. Some other embodiments of spray-type dispenser are disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. An example of a particular product shape is shown in FIG. 9 of U.S. Pat. No. 6,258,765, which is incorporated herein by reference.

In some embodiments, the rinse aid may be formulated for a particular application. For example, in some embodiments, the rinse aid may be particularly formulated for use in warewashing machines. As discussed above, there are two general types of rinse cycles in commercial warewashing machines. A first type of rinse cycle can be referred to as a hot water sanitizing rinse cycle because of the use of generally hot rinse water (about 180° F.). A second type of rinse cycle can be referred to as a chemical sanitizing rinse cycle and it uses generally lower temperature rinse water (about 120° F.).

In some embodiments, it is believed that the rinse aid composition of the invention can be used in a high solids containing water environment in order to reduce the appearance of a visible film caused by the level of dissolved solids provided in the water. In general, high solids containing water is considered to be water having a total dissolved solids (TDS) content in excess of 200 ppm. In certain localities, the service water contains total dissolved solids content in excess of 400 ppm, and even in excess of 800 ppm. The applications where the presence of a visible film after washing a substrate is a particular problem includes the restaurant or warewashing industry, the car wash industry, and the general cleaning of hard surfaces. Exemplary articles in the warewashing industry that can be treated with a rinse aid according to the invention include dishware, cups, glasses, flatware, and cookware. For the purposes of this invention, the terms “dish” and “ware” are used in the broadest sense to refer to various types of articles used in the preparation, serving, consumption, and disposal of food stuffs including pots, pans, trays, pitchers, bowls, plates, saucers, cups, glasses, forks, knives, spoons, spatulas, and other glass, metal, ceramic, plastic composite articles commonly available in the institutional or household kitchen or dining room. In general, these types of articles can be referred to as food or beverage contacting articles because they have surfaces which are provided for contacting food and/or beverage. When used in these warewashing applications, the rinse aid should provide effective sheeting action and low foaming properties. In addition to having the desirable properties described above, it may also be useful for the rinse aid to be biodegradable, environmentally friendly, and generally nontoxic. A rinse aid of this type may be described as being “food grade.”

The above description provides a basis for understanding the broad meets and bounds of the invention. The following examples and test data provide an understanding of certain specific embodiments of the invention. The invention will be further described by reference to the following detailed examples. These examples are not meant to limit the scope of the invention. Variation within the concepts of the invention is apparent to those skilled in the art.

EMBODIMENTS

Exemplary ranges of the solid rinse aid compositions according to the invention are shown in Table 1 in weight percentage of the solid rinse aid compositions.

TABLE 1

| Material | First Exemplary Range wt. % | Second Exemplary Range wt. % | Third Exemplary Range wt. % |
|---|---|---|---|
| Defoamer | 1-60 | 5-50 | 8-35 |
| Polyacrylic Acid Homopolymer | 1-40 | 1-15 | 1-10 |
| Sheeting Agent | 1-45 | 1-35 | 1-25 |
| Solidification Agent | 10-80 | 20-75 | 25-70 |

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The materials used in the following Examples are provided herein:

Novel II 1012-21: an alcohol ethoxylate, available from Sasol.

Pluronic 25 R2: a polyethylene oxide-polypropylene oxide block copolymer, available from the BASF.

Kathon CG: a methylchloroisothiazolinone and methylisothiazolinone blend, available from Dow Chemical.

Acusol 445ND: a dried polyacrylic acid (930%), available from Dow Chemical.

The experiments described in the examples were performed using concentrated formulations provided in Table 2. These formulations were prepared into solid blocks.

TABLE 2

| Description | Formula 1 | Formula 2 | Formula 3 | Formula 4 | Formula 5 |
|---|---|---|---|---|---|
| Urea | 60 | 60 | 60 | 60 | 60 |
| Novel II | 5 | 5 | 5 | 5 | 5 |
| Pluronic 25R2 | 11 | 11 | 11 | 11 | 11 |
| Kathon CG | 0.5 | 0.5 | 0.5 | 0.5 | 0.5 |
| Sodium Citrate dehydrate | 0 | 10 | 0 | 0 | 10 |
| Acusol 445ND | 0 | 0 | 5 | 10 | 5 |
| Water | Balance | Balance | Balance | Balance | Balance |
| RA Sump Solution (5% equivalent) | 5.00% | 5.65% | 5.33% | 5.65% | 5.98% |

The formulations were dispensed at a rate of 4 mL per cycle. The concentrations of the formulation in the use solution as tested are provided in the Table 3.

TABLE 3

| Description | Formula 1 | Formula 2 | Formula 3 | Formula 4 | Formula 5 |
|---|---|---|---|---|---|
| Urea (ppm) | 42.74 | 42.74 | 42.74 | 42.74 | 42.74 |
| Novel II (ppm) | 3.56 | 3.56 | 3.56 | 3.56 | 3.56 |
| Pluronic 25R2 (ppm) | 7.84 | 7.84 | 7.84 | 7.84 | 7.84 |
| Kathon CG (ppm) | 0.36 | 0.36 | 0.36 | 0.36 | 0.36 |
| Sodium Citrate dehydrate (ppm) | 0.00 | 7.12 | 0.00 | 0.00 | 7.12 |
| Acusol 445ND (ppm) | 0.00 | 0.00 | 3.31 | 6.62 | 3.31 |

Example 1

One Hundred-Cycle Film Evaluation for Institutional Warewash Detergents

To determine the ability of various detergent compositions to remove spots and film from ware, six Libby 10 oz. glass tumblers were prepared by removing all film and foreign material from the surfaces of the glasses. An Apex HT warewash machine was then filled with an appropriate amount of water and the water was tested for hardness.

After recording the hardness value, the tank heaters were turned on. On the day of the experiments, the water hardness was 17 grains. The warewash machine was turned on and wash/rinse cycles were run through the machine until a wash temperature of between about 150° F. and about 160° F. and a rinse temperature of between about 175° F. and about 190° F. were reached. The controller was then set to dispense an appropriate amount of detergent into the wash tank. The detergent was dispensed such that when the detergent was mixed with water during the cycle to form a use solution, the detergent concentration in the use solution was 775 parts per million (ppm). The solution in the wash tank was titrated to verify detergent concentration. The warewash machine had a washbath volume of 30.28 liters, a rinse volume of 3.6 liters, a washtime of 50 seconds, and a rinse time of 9 seconds.

The six clean glass tumblers were placed diagonally in a Raburn rack and one Newport 10 oz. plastic tumbler were placed off-diagonally in the Raburn rack (see figure below for arrangement) and the rack was placed inside the warewash machine. (P=plastic tumbler; G=glass tumbler).

| | | | | | |
|---|---|---|---|---|---|
| | | | | | G |
| | | | | G | |
| | | | G | | |
| | | G | | | |
| | G | | | P | |
| G | | | | | |

The 100 cycle test was then started. At the beginning of each wash cycle, the appropriate amount of detergent was automatically dispensed into the warewash machine to maintain the initial detergent concentration. The detergent concentration was controlled by conductivity.

Upon completion of 100 cycles, the rack was removed from the warewash machine and the glass and plastic tumblers were allowed to dry. The glass and plastic tumblers were then graded for spot and film accumulation using an analytical light box evaluation.

The light box test used a digital camera, a light box, a light source, a light meter and a control computer employing "Spot Advance" and "Image Pro Plus" commercial software. A glass to be evaluated was placed on its side on the light box, and the intensity of the light source was adjusted to a predetermined value using the light meter. A photographic image of the glass was taken and saved to the computer. The software was then used to analyze the upper half of the glass, and the computer displayed a histogram graph with the area under the graph being proportional to the thickness of the film.

Generally, a lower light box score indicates that more light was able to pass through the tumbler. Thus, the lower the light box score, the more effective the composition was at preventing scale on the surface of the tumbler.

The results of the 100-Cycle Light Box test are shown in Table 4 and its corresponding figure. A "max" value is equivalent to a score of 65535.

TABLE 4

| 100-cycle Light box | G1 | G2 | G3 | G4 | G5 | G6 | Sum Glass Score | Plastic Score P1 | Sum Total Score |
|---|---|---|---|---|---|---|---|---|---|
| 1 | Max | Max | Max | Max | Max | Max | 393210 | Max | 458745 |
| 2 | Max | Max | Max | Max | Max | Max | 393210 | Max | 458745 |
| 3 | 24678 | 29678 | 26767 | 29196 | 33853 | 29648 | 173820 | 64962 | 238782 |
| 4 | 20576 | 26182 | 27646 | 25488 | 25597 | 19860 | 145349 | 64673 | 210022 |
| 5 | 26032 | 25657 | 24580 | 25145 | 23929 | 20819 | 146162 | 57182 | 203344 |
| Untreated Glasses | 14692 | 15714 | 14852 | 14508 | 14603 | 15121 | 89490 | 36521 | 126011 |

The above specification provides a description of the manufacture and use of the disclosed compositions and methods. Since many embodiments can be made without departing from the spirit and scope of the invention, the invention resides in the claims.

What is claimed is:

1. A solid rinse aid composition comprising:

from about 55 wt. % to about 80 wt. % of a solidification agent, wherein the solidification agent comprises an aromatic sulfonate;

from about 1 wt. % to about 45 wt. % of a sheeting agent comprising one or more alcohol ethoxylates;

from about 1 wt. % to about 35 wt. % of a defoamer component comprising a polymer compound including one or more ethylene oxide groups;

from about 1 wt. % to about 40 wt. % of a polyacrylic acid homopolymer or alkali metal salt thereof; and from about 0.1 wt. % to about 20 wt. % of a hydroxycarboxylic acid.

2. The composition of claim 1, wherein the solidification agent is present between about 55 wt. % and about 75 wt. % of the composition.

3. The composition of claim 1, wherein the sheeting agent is present between about 1 wt. % and about 35 wt. % of the composition, and wherein the defoamer is present between about 5 wt. % and about 35 wt. % of the composition.

4. The composition of claim 1, wherein the polyacrylic acid homopolymer or alkali metal salt thereof is present from about 1 wt. % and about 10 wt. % of the composition.

5. The composition of claim 1, further comprising a preservative, wherein the preservative is selected from the group consisting of methylchloroisothiazolinone, methylisothiazolinone, sodium pyrithione, and mixtures of the same.

6. The composition of claim 5, wherein the hydroxycarboxylic acid comprises citric acid, an anhydrous alkali metal salt of citric acid, a hydrated alkali metal salt of citric acid and combinations thereof.

7. The composition of claim 5, wherein the preservative is present between about 0.01 wt. % and about 5 wt. % of the composition, and wherein the hydroxycarboxylic acid is present from about 0.1 wt. % to about 20 wt. % of the composition.

8. A method for making the solid rinse aid composition of claim 1 comprising:

mixing the solidification agent, the sheeting agent comprising one or more alcohol ethoxylates, the defoamer component comprising the polymer compound including the one or more ethylene oxide groups, the polyacrylic acid homopolymer, and the hydroxycarboxylic acid to form a mixture;

forming the solid rinse aid composition.

9. The method of claim 8, wherein the mixture is heated prior to forming a solid rinse aid composition.

10. The method of claim 8, wherein the solidification agent is present between about 55 wt. % and about 75 wt. % of the composition; wherein the sheeting agent is present between about 1 wt. % and about 35 wt. % of the composition; and wherein the defoamer is present between about 5 wt. % and about 35 wt. % of the composition.

11. The method of claim 8, wherein the forming is by casting, extruding, or pressing the mixture to form the solid rinse aid composition.

12. The method of claim 11, wherein the forming step further comprises setting up the composition after casting, extruding, or pressing; wherein the setting up is for a time between about 1 minute to 3 hours.

13. The method of claim 8, wherein the method further comprises a polyacrylic acid homopolymer or alkali metal salt thereof is present between about 1 wt. % and about 10 wt. % of the composition.

14. The method of claim 8, further comprising a preservative to form the mixture.

15. The method of claim 14, wherein the preservative is present between about 0.01 wt. % and about 5 wt. % of the composition; and wherein the preservative is selected from the group consisting of methylchloroisothiazolinone, methylisothiazolinone, sodium pyrithione, and mixtures thereof.

16. The method of claim 8, wherein the hydroxycarboxylic acid is present from about 0.1 wt. % to about 20 wt. % of the composition; and wherein the hydroxycarboxylic acid comprises citric acid, an anhydrous alkali metal salt of citric acid, a hydrated alkali metal salt of citric acid and combinations thereof.

17. The method according to claim 8, further comprising one or more additional functional ingredients to form the mixture.

18. A method of cleaning a surface comprising:
- forming a use solution by diluting the rinse aid composition of claim 1 with water; wherein the use solution of the rinse aid composition comprises from about 5 ppm to about 2000 ppm of active materials;
- contacting a soiled surface with the use solution.

19. The method of claim 18, wherein the soiled surface is further contacted with a detergent.

20. The method of claim 19, wherein the soiled surface is a ware, and wherein the rinse aid composition contacts the soiled surface after the detergent.

* * * * *